3,069,415
PREPARATION OF 21-METHYL-Δ⁴-PREGNENE-17α-OL-3,20-DIONE AND INTERMEDIATES
Sanford K. Figdor, Gales Ferry, Hans-Jurgen E. Hess, Groton, and Gerald D. Laubach, Niantic, Conn., assignors to Chas. Pfizer & Co., Inc., New York, N.Y., a corporation of Delaware
No Drawing. Filed May 11, 1960, Ser. No. 28,188
7 Claims. (Cl. 260—239.55)

This application is concerned with a new and useful process for the preparation of the valuable steroid compound, 21-methyl-Δ⁴-pregnene-17α-ol-3,20-dione. This latter compound is described in copending and concurrently filed patent application, Serial No. 28,185, which also describes the use of the compound in the preparation of adrenocortically active steroids. This application is also concerned with certain valuable intermediates useful for the preparation of 21-methyl-Δ⁴-pregnene-17α-ol-3,20-dione.

The process of this application in one of its modifications is shown in the following synthetic sequence:

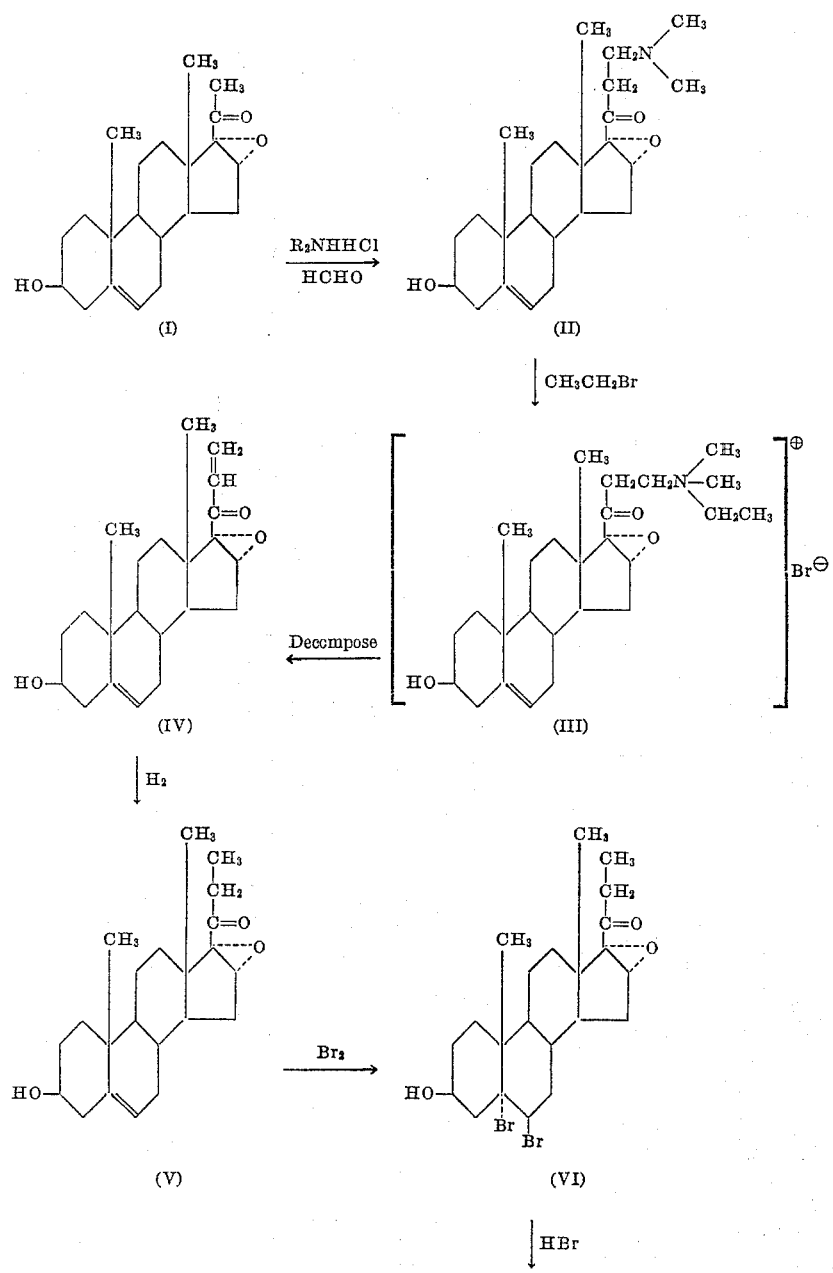

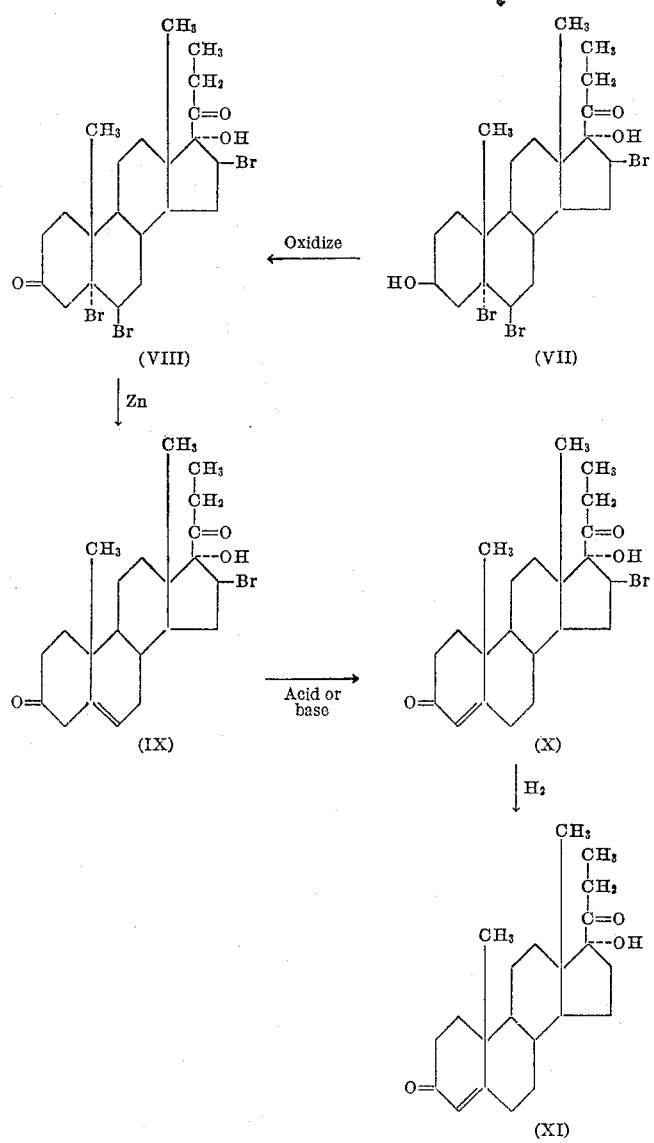

Although the above reaction sequence in specific instances illustrates the use of specific reagents, it should be understood, and will be explained more fully hereinafter, that other reagents may be employed. For example, the use of ethyl bromide is shown in the preparation of Compound III. It is also possible to use other quaternizing agents to prepare analogs of Compound III.

Compound XI will be recognized as the compound whose preparation is one of the objects of this invention. Compounds II through X are new and are specifically included within the scope of the invention.

In the first step of this invention, the known compound, 16α,17α-oxido-Δ⁵-pregnene-3β-ol-20-one (16,17-oxidopregnenolone) is converted to a dialkyl-aminomethyl compound. This is effected by reaction with an amine acid addition salt and formaldehyde. The amine salt may be symmetrical or non-symmetrical, cyclic or non-cyclic. Preferably, it is a lower alkyl amine salt containing up to four carbon atoms in each alkyl group. These latter are generally preferred since they are readily available at a reasonable price. Preferred amine salts include, for example, diethyl amine sulfate, methyl ethyl amine sulfate, di-n-butyl amine hydrobromide and ethyl isopropyl amine hydriodide. Hydrochloride salts are generally preferred and of these, dimethyl amine hydrochloride is the most desirable since it is most readily available and gives good yields. Further, it is sometimes desirable to add small amounts of acid before or during the reaction so as to maintain the pH of the reaction mixture at from about 2.5 to about 5.0. This is most conveniently accomplished with hydrochloric acid.

In carrying out the reaction, the reactants are mixed together in the selected solvent and maintained at a temperature of from about 90° C. to about 140° C. for from about two to about twenty-four hours. The preferred solvents for the reaction are alkanols containing up to five carbon atoms, although other lower aliphatic oxygenated solvents can be used. The preferred alkanols are n-propanol and n-butanol since they reflux at atmospheric pressure within the preferred temperature range. Obviously, however, higher boiling solvents can be used, although usually not at the reflux temperature. Similarly, lower boiling solvents such as methyl and ethyl alcohol are useful if the reaction is carried out under pressure. It is generally most convenient to employ an excess of the paraldehyde and amine salt, to insure as complete a reaction as possible of the more expensive pregnene derivatives. A molar excess of from about 50% to about 600% or even more can be used. The amount is not critical.

The reaction will often be carried out in an inert atmosphere, for example, a nitrogen atmosphere so as to minimize loss of reaction product by side reactions. This, however, is not necessary.

At the end of the reaction period, the desired product may be isolated by evaporating the solvent, preferably in vacuo, purified by triturating with hot dilute hydrochloric acid followed in the case of compounds forming soluble hydrochlorides with hot water. The water and dilute acid solutions are combined and made basic with dilute aqueous alkali, for example, 10% sodium carbonate, bicarbonate or similar reagent. Occasionally, the pure product will precipitate from the basic solution and may be recovered by filtration. If it does not precipitate, it may be extracted with a water immiscible lower hydrocarbon or halogenated hydrocarbon solvent such as ethylene chloride, chloroform, carbon tetrachloride, chlorobenzene, hexane or octane. The desired product is then recovered from the organic solvent by evaporation in vacuo. The extraction step may also be employed with those products which precipitate from the alkaline solution and thus increase the overall yield.

The amine prepared as described above is next converted to a quaternary ammonium halide using procedures generally employed for this purpose. Thus, for example, the amine is mixed in a lower alkanol solvent, e.g. methanol or ethanol with an alkyl halide containing up to four carbon atoms and simply allowed to stand for from about six to about sixteen hours at from about 20° C. to about 30° C. Usually an excess of as much as fifty percent or more of alkyl halide will be used, but this is not essential. The solvent is removed, for example, by evaporation in vacuo and the product recovered as a residue. It may be purified by trituration with ether, acetone or other similar solvent. Methanol and ethanol are the preferred solvents for the reaction because of their good solubility characteristics and also because they can be readily evaporated due to their low boiling point.

The preferred alkyl halides are methyl or ethyl bromide. These are preferred because they are the easiest to obtain and because at the temperatures used, they are liquids. Other alkyl halides such as methyl or ethyl chloride can be used but they are usually less convenient since they are gases at ordinary temperature and pressure. Butyl bromide, methyl iodide or isopropyl chloride may be employed. The iodides are generally not preferred because they form insoluble precipitates when the quaternary compound is decomposed to form the propenoyl compounds in accordance with the equations shown below. They can be used, however, and the product purified by repeated recrystallizations or by standard chromatographic procedures.

The quarternary compound thus prepared is converted to a 17β-propylene compound. This is accomplished by reaction with water or aqueous alkali for from about one to about six hours at a temperature of from about 20° C. to about 30° C. Temperatures below and above this preferred range can be used although less satisfactorily. Thus, if a temperature considerably below 20° C. is used, the reaction is too slow to be practical and if a temperature considerably above 30° C. is used, there may be some decomposition of the desired product.

Although the desired products form by simple reaction with water, they form more readily and often in higher yields if the reaction is carried out at an alkaline pH of from about 7.5 to about 12. The desired alkalinity may be effected by adding a small amount of aqueous solution containing from about 2% to about 10% by weight of an alkali or alkaline earth metal hydroxide, oxide, carbonate, bicarbonate or alkali metal acetates, tartrates or citrates.

In summary, the desired products are formed by mixing the quaternary lower alkyl ammonium halides illustrated above in an aqueous solution at a pH of from about 7 to about 12 at a temperature of from about 20° C. to about 30° C. for a period of from about one to about six hours.

The aqueous solution may contain a small amount of tert-butanol to enhance solubility.

Usually the desired product will precipitate from the reaction mixture as it forms and reaction is complete when no more precipitate forms. Occasionally, however, the desired product will not precipitate. In these cases, the product may be isolated by extraction with a water immiscible hydrocarbon or halogenated hydrocarbon solvent including, for example, ethylene dichloride, chloroform, carbon tetrachloride, chlorobenzene and benzene. It is, of course, possible to use an extraction procedure whether or not the product precipitates and this may often result in better overall yields. If an extraction step is used, it may be desirable to add a small amount of acid to the aqueous mixture to insure that all of the amine by-product of the main reaction is converted to an acid salt which is insoluble in the organic solvent.

Occasionally, when a quaternary iodide is used, the iodide salt which forms is insoluble in water. Obviously, this could lead to contamination of the final product particularly if it is insoluble in water and co-precipitates with the iodide salt. In these instances and in any other instances where there is co-precipitation of the main product and by-product, it is always preferred to use an extraction step.

The propenoyl compounds are isolated from the organic solvent by removal of the solvent in vacuo, preferably after drying the solvent using an anhydrous drying agent such as sodium or magnesium sulfate. The product may be further purified by recrystallization from a suitable solvent such as methyl alcohol.

It is also possible to prepare the propenoyl compound directly from the amine. Thus, the amine acid addition salt may be taken up in ethanol, the quaternizing agent together with a small amount of a basic reagent such as potassium acetate, is added and the mixture is refluxed for approximately five hours. The product is isolated by removal of most of the solvent and precipitation with water.

In the next step of this process, the propenoyl group at the 17β-position is reduced to a propanoyl group with hydrogen in the presence of a catalyst. In carrying out the reduction process, i.e., the hydrogenation process, it is preferred to employ temperatures of from about 15° C. to about 35° C. although somewhat higher temperatures are not deleterious. Hydrogen pressures at from slightly below atmospheric to about 10 atmospheres may be employed. Generally speaking, room temperature and atmospheric pressure are simplest and are fully satisfactory. The reduction should be terminated when the theoretical amount of hydrogen has been adsorbed. This can be readily determined by observing the change in pressure of the hydrogen. At atmospheric pressure using laboratory quantities of reactants, the theoretical amount of hydrogen is generally consumed in less than an hour. For commercial operations, the duration of the reaction may be somewhat increased. The time of the reaction is not critical.

The products of the reaction may be isolated with relative ease; preferably, the catalyst is filtered and the solvent removed in vacuo. Often, the desired product is obtained in sufficient purity for the next reaction by simply removing the solvent. In other cases, it may be desirable to subject the material to conventional purification procedures such as recrystallization or chromatography.

The preferred catalyst for the reaction is palladium and this may be used with or without a carrier. Especially useful catalysts include 10% palladium on carbon or palladium on calcium carbonate. The proportion of catalyst to reactants is not critical and may vary widely. Between about 10% and about 500% by weight of the steroid is satisfactory and between 50% and 100% is preferred.

The hydrogenation should be conducted in a liquid system. The choice of solvent is not critical. Suitable solvents include lower aliphatic oxygenated solvents containing up to five carbon atoms such as alkanols, esters or ketones including methanol, ethanol, ethyl acetate, propyl acetate, acetone, and methyl isopropyl ketone.

The compound thus prepared is next converted to the corresponding $5\alpha,6\beta$-dibromo compound by reaction with from about 1 to about 1.1 molar equivalents of bromine. The reaction is effected by treating the steroid compound with the selected quantity of bromine at a temperature of from about 0° C. to about 40° C., preferably 20° C. to 30° C. for a period of from about one-half to about four hours.

One should not employ more than 1.1 molar equivalents of bromine since there is some danger of replacement of a hydrogen atom at the 21-position with a bromine atom and in preferred operations, from about 1 to about 1.05 molar equivalents is used.

Suitable solvents include hydrocarbon and halogenated hydrocarbon solvents containing up to seven carbon atoms and acetic acid. Methylene chloride, ethylene chloride, chloroform, carbon tetrachloride, benzene, toluene and chlorobenzene may be mentioned by way of example. Mixtures of solvents can also be employed.

In a preferred method, the steroid is taken up in the selected solvent and 1.05 molar equivalents of bromine solution comprising bromine dissolved in the same solvent is added while maintaining the temperature at from about 20° C. to about 30° C. The mixture is then allowed to stand at this same temperature until most of the bromine color has disappeared. This usually takes from about two to about four hours.

The product may be isolated by any of a number of means known to those skilled in the art. In one especially suitable method, a slight vacuum is first applied to the mixture to remove most of the hydrogen bromide which forms in the reaction. The solution is then washed with an alkaline reagent and with water. Suitable alkaline reagents include, for example, 5% aqueous sodium carbonate, bicarbonate, hydroxide or equivalent potassium salts. The organic layer is then dried over an anhydrous drying agent such as sodium or magnesium sulfate, filtered and the solvent removed in vacuo to leave the desired product as a residue.

In the next step of the process of this invention, the epoxide ring at the 16,17-position is converted to a bromohydrin, that is, a $16\beta$-bromo-$17\alpha$-hydroxy compound by reaction with hydrogen bromide.

The bromohydrin is formed by treating the epoxide in a reaction inert organic solvent, preferably a lower aliphatic organic acid such as acetic or butyric acid with hydrogen bromide dissolved in a similar reaction inert solvent. In preferred operations, the steroid is dissolved in acetic acid and the hydrogen bromide is added in the form of a 20% to 32% solution of this reagent in acetic acid. The reaction is carried out at from about 10° C. to about 30° C., preferably 15° C. to 25° C. The reaction mixture is simply allowed to stand at the selected temperature and the bromohydrin forms. At least a molar equivalent of hydrogen bromide is used and preferably an excess of from about 10% to about 100% is employed. The time of reaction is from about one-half to about four hours.

The product may be isolated from the reaction mixture by evaporating the solvent or by commingling the mixture with cold water. In the event that the solvent is evaporated, it may be helpful to wash the residue with a small amount of ether to induce crystallization. If the water method is used, the product precipitates and is recovered by filtration.

The hydroxyl group at the 3-position is next oxidized to form a 3-keto compound. The choice of oxidizing agent is not critical, although it is preferred to use chromic acid in accordance with standard procedures. One procedure which is especially effective is to use 8 N chromic acid prepared by dissolving 66.7 g. of chromic acid in a minimum of water and adding 53.3 ml. of concentrated sulfuric acid. The mixture is then made up to a total volume of 250 ml. by the addition of acetone. The use of this reagent is illustrated in the examples.

Alternatively, the standard chromic acid-acetic acid couple can be employed. This reagent is prepared by dissolving sufficient chromium trioxide in a 9:1 acetic acid-water mixture to provide a solution containing 76 mgs. of chromium trioxide per ml.

Other oxidizing agents well known in the art can also be prepared.

The bromine atoms at the 5- and 6-positions are next removed by reaction with zinc dust and this reagent is used in excess preferably from about 100% to about 200% excess. Reaction is effected in a lower alkanol solvent such as methanol or ethanol at a temperature of from about 35° C. to about 80° C. for a period of from about 1 to about 2 hours. The addition of a halogenated hydrocarbon solvent such as chloroform or ethylene chloride may aid in maintaining the steroid in solution but this is not necessary. The addition of a small amount of acetic acid followed by a short reflux period is often helpful in solubilizing some of the zinc salts. This is not essential, however. The compound may be isolated by removing the solvent in vacuo after filtering off the solids.

The 3-keto-$\Delta^5$-compound thus obtained is isomerized to a $\Delta^4$-compound. Isomerization is effected with either sulfuric acid or ammonium hydroxide. Of these, ammonium hydroxide is preferred since with this reagent, there is less danger of opening the epoxide ring at the 16,17-position. In either event, only small amounts of the isomerizing agent are used, say, for example, from 2% to 8% by volume. Suitable solvents include lower alkanols containing up to five carbon atoms. Methanol and ethanol are especially suitable.

In carrying out the reaction, the $\Delta^5$-compound is taken up in the solvent containing the isomerizing agent and maintained at a temperature of from about 20 to about 40° C. for a period of from about 10 to about 60 minutes.

The product may be isolated by any of a number of means which will be apparent to those skilled in the art. For example, one may neutralize the isomerizing agent by the addition of dilute acid or dilute base and concentrate the resulting solution to a small volume. The desired product is then precipitated by the addition of water. Alternatively, one may completely remove the solvent by distillation in vacuo to leave the desired product as a residue. The small amount of inorganic salt contained in the residue is removed by trituration with water. The pure product may also be obtained by taking up the residue in a halogenated hydrocarbon solvent containing up to two carbon atoms such as chloroform, methylene chloride or ethylene chloride, filtering to remove the insoluble material and evaporation of the solvent.

In the last step of the process of this invention, the bromine atom at the 16-position is removed by reductive dehalogenation with Raney nickel.

Suitable solvents for carrying out the reaction with Raney nickel include reaction inert organic solvents such as lower aliphatic oxygenated solvents including ethers, alcohols, acids and ketones containing up to five carbon atoms. Methanol, ethanol, propanol, isopropanol, pentanol, acetone, methyl isopropyl ketone, dioxane, acetic acid and propionic acid are examples of suitable solvents. The use of a mixed solvent such as methanol-acetic acid is sometimes advantageous.

The amount of Raney nickel used is not critical although to insure the most economical utilization of the steroid starting material, it is generally preferred to use an excess of this dihalogenating agent. From four to twenty grams of Raney nickel per gram of steroid has been found to provide suitable yields. The preferred excess, as will be recognized by those skilled in the art, will depend upon the degree of activity of the Raney nickel. This, in turn, will depend upon its previous treatment. With Raney nickel which has been washed first with water, then with acetic acid, then with methanol and finally with acetone, in accordance with known procedures, it is usually found that from ten to fifteen grams of Raney nickel per gram of steroid give suitable results. However, the Raney nickel can be used without pervious treatment or with other known treatments and still function as a halogenating agent when employed in accordance with the procedures of this invention.

The duration of the reaction is not critical, and depends only on the degree of activity of the Raney nickel. This degree of activity is readily determined by tests well known to those skilled in the art, and include, for example, the reduction of known compounds requiring varying degrees of reducing activity. Reaction periods as short as five minutes or as long as twenty-four hours can be used. It is, however, preferred to carry out the reaction during a period of from about one-half hour to six hours.

For optimum yields, the temperature of the reaction should be controlled so that it does not rise above 30° C. during the reaction period and it is best to carry out the reaction between 0° C. and 15° C.

Although it is not essential, it is preferred to carry out the reaction in an inert atmosphere such as a nitrogen atmosphere. This assures the most efficient use of the Raney nickel by minimizing its reaction with atmospheric oxygen.

As stated above, the compound prepared by the process of this invention is useful for the preparation of adrenocortically active steroids. One adrenocortically active steroid which can be produced from the final product of this invention using the process of copending patent application, Serial No. 28,185, filed May 11, 1960, is 21-methyl-$\Delta^4$-pregnene-11$\beta$,17$\alpha$,21-triol-3,20-dione 21-acetate.

To accomplish this transformation, Compound XI is hydroxylated at the 11$\beta$-position using, for example, *Curvularia lunata* as described and claimed in U.S. Patent 2,658,023, issued November 3, 1953.

The 11$\beta$-hydroxyl compound is next iodinated at the 21-position by reaction with from 4 to 6 molar equivalents of calcium oxide and 1.5 to 2 molar equivalents of iodine in a solvent system comprising 2 volumes of tetrahydrofuran and 1 volume of a lower alkanol containing up to four carbon atoms. The solvent system should contain a tertiary butyl hydroperoxide in a quantity equivalent to from 0.006 to 0.018 gram of iodine/ml. of tetrahydrofuran. The reaction is carried out at a temperature of from about 20° C. to about 40° C. for a period of from about 2 to about 5 hours.

The iodo compound is converted to a 21-acetoxy compound by reaction with from about a 200% molar excess to a 2000% molar excess of sodium or potassium acetate in dimethyl formamide or an aliphatic ester or ketone containing up to five carbon atoms at a temperature of from about 40° C. to about 100° C. for a period of from about 4 to about 24 hours. Mixtures of these solvents may also be employed.

The following examples are given solely for the purpose of illustration and are not to be construed as limitations of this invention, many apparent variations of which are possible without departing from the spirit or scope thereof.

EXAMPLE I

*16$\alpha$,17$\alpha$-Oxido-21-Dimethylaminomethyl-$\Delta^5$-Pregnene-3$\beta$-ol-20-One*

A total of 25 grams of 16$\alpha$,17$\alpha$-oxido-$\Delta^5$-pregnene-3$\beta$-ol-20-one was taken up in 350 ml. of methanol containing 12 grams of paraformaldehyde and 40 grams of dimethylamine hydrochloride. The mixture was maintained at 90° C. under pressure for 24 hours. The hot mixture was filtered and the solution evaporated in vacuo. The residue was digested with hot 0.25 N hydrochloric acid, filtered and the filtrate made basic with 10% sodium carbonate. The solution was extracted with chloroform, the organic layer dried over anhydrous sodium sulfate, filtered and the solvent removed in vacuo to leave the desired product as a residue.

EXAMPLE II

*16$\alpha$,17$\alpha$-Oxido-21-Diethylaminomethyl-$\Delta^5$-Pregnene-3$\beta$-ol-20-One*

A total of 35 grams 16$\alpha$,17$\alpha$-oxido-$\Delta^5$-pregnene-3$\beta$-ol-20-one was taken up in 500 ml. of n-amyl alcohol containing 20 grams of paraformaldehyde, 60 grams of diethylamine sulfate and 2 ml. of dilute hydrochloric acid. The mixture was refluxed for 2 hours in a nitrogen atmosphere and filtered. The solution was then evaporated in vacuo and the residue digested with 150 ml. of hot 0.25 N hydrochloric acid and filtered. The filtrate was adjusted to an approximate pH of 11 with 10% sodium carbonate. The aqueous solution was extracted with chloroform, the organic layer dried over anhydrous magnesium sulfate, filtered and the desired product obtained by removing the solvent in vacuo.

EXAMPLE III

*16$\alpha$,17$\alpha$-Oxido-21-Methyl-Ethylaminomethyl-$\Delta^5$-Pregnene-3$\beta$-ol-20-One*

A total of 10 grams of 16$\alpha$,17$\alpha$-oxido-$\Delta^5$-pregnene-3$\beta$-ol-20-one was taken up in 500 ml. of n-butanol containing 5 grams of paraformaldehyde, 16 grams of methyl ethylamine hydrochloride and 15 drops of 3 N hydrochloric acid. The solution was refluxed under nitrogen for 4 hours during which time an additional 1 ml. of 3 N hydrochloric acid was added to maintain the acidity at a pH of 2.5. The solvent was removed in vacuo and the residue digested with two 200 ml. portions of hot 0.25 N hydrochloric acid. The residue was washed with water, filtered and the filtrate adjusted to a pH of approximately 10 with 10% aqueous sodium carbonate. It was extracted with benzene, the organic layer dried over anhydrous sodium sulfate, filtered and the solvent removed in vacuo to leave the desired product as a residue.

EXAMPLE IV

*16$\alpha$,17$\alpha$-Oxido-21-Diethylaminomethyl-$\Delta^5$-Pregnene-3$\beta$-ol-20-One*

A total of 25 grams of 16$\alpha$,17$\alpha$-oxido-$\Delta^5$-pregnene-3$\beta$-ol-20-one was taken up in 350 ml. of butanol containing 12 grams of paraformaldehyde and 40 grams of diethylamine phosphate and 10 ml. of 2.3 N phosphoric acid. The mixture was refluxed for 20 hours during which time an additional small portion of 2 N phosphoric acid was added to maintain the acidity at a pH of 5.0. The hot mixture was filtered and the solution evaporated in vacuo. The residue was digested with hot 0.2 N phosphoric acid, filtered and the filtrate made basic with 10% sodium carbonate. The solution was extracted with ethylene dichloride, the organic layer dried over anhydrous sodium sulfate, filtered and the solvent removed in vacuo to leave the desired product as a residue.

EXAMPLE V

*16$\alpha$,17$\alpha$-Oxido-21-Dibutylaminomethyl-$\Delta^5$-Pregnene-3$\beta$-ol-20-One*

A total of 20 grams of 16$\alpha$,17$\alpha$-oxido-$\Delta^5$-pregnene-3$\beta$-ol-20-one was taken up in 750 ml. of n-butanol containing 15 grams of paraformaldehyde, 20 grams of dibutylamine hydrobromide and 3 ml. of 40% aqueous hydrobromic acid. The mixture was refluxed for 2 hours and filtered. The filtrate was evaporated in vacuo and the residue digested with 150 ml. of hot 0.25 N hydrobromic acid and filtered. The filtrate was adjusted to a pH of approximately 10 with 10% sodium carbonate. The aqueous solution was extracted with carbon tetrachloride, the organic layer dried over anhydrous magnesium sulfate, filtered and the desired product obtained by removing the solvent in vacuo.

EXAMPLE VI

*Preparation of Quaternary Ammonium Compounds*

The following procedures are illustrative of the methods used to prepare the quaternary ammonium halides of this invention.

A solution of 7.5 grams of the product obtained in Example I in 180 ml. of methanol containing 80 ml. of methyl bromide was allowed to stand overnight and the mixture was then evaporated to dryness in vacuo. The residue was triturated with acetone and the desired product recovered by filtration. An additional crock of quaternary compound may be obtained by evaporation of the acetone filtrate and this is purified by trituration with methanol and recovered by filtration. The product obtained was $16\alpha,17\alpha$-oxido - 21 - dimethylaminomethyl-$\Delta^5$-pregnene-$3\beta$-ol-20-one methyl bromide.

A solution of 7.5 grams of the product obtained in Example II in 150 ml. of ethanol containing a 50% molar excess of butyl chloride was allowed to stand at 25° C. for 16 hours and the mixture was then evaporated to dryness in vacuo. The residue was triturated with acetone and the desired product recovered by filtration. The product obtained was $16\alpha,17\alpha$-oxido-21-dimethylaminomethyl-$\Delta^5$-pregnene-$3\beta$-ol-20-one butyl chloride.

A solution of 8 grams of the product obtained in Example III in 200 ml. of methanol containing a 20% molar excess of ethyl iodide was allowed to stand for 20 hours at approximately 28° C. and the mixture was then evaporated to dryness in vacuo. The residue was triturated with ether and the desired product recovered by filtration. The product obtained was $16\alpha,17\alpha$-oxido-21-methylethylaminomethyl-$\Delta^5$-pregnene-$3\beta$-ol-20 - one ethyl iodide.

Other quaternary alkyl ammonium halide salts of the product prepared in Examples I through V in which the alkylating agents contained up to four carbon atoms are prepared in accordance with the procedure of this example.

EXAMPLE VII

*$16\alpha,17\alpha$-Oxido-21-Methylene-$\Delta^5$-Pregnene-$3\beta$-ol-20-One*

A solution of 20 mgs. of $16\alpha,17\alpha$-oxido-21-dimethylaminomethyl-$\Delta^5$-pregnene-$3\beta$-ol-20-one ethyl bromide in 10 ml. of water was prepared and clarified by filtration. To the solution, there was added 68 mgs. of sodium bicarbonate in 2 ml. of water at 25° C. A white precipitate of the desired product separated and the suspension was stirred for 1 hour, filtered, washed with water and dried in vacuo.

EXAMPLE VIII

*$16\alpha,17\alpha$-Oxido-21-Methylene-$\Delta^5$-Pregnene-$3\beta$-ol-20-One*

A solution containing 200 mgs. of $16\alpha,17\alpha$-oxido-21-diethylaminomethyl-$\Delta^5$-pregnene-$3\beta$-ol-20-one butyl chloride was dissolved in 10 ml. of water and stirred at 20° C. for 6 hours. The desired product separated and was recovered by filtration.

EXAMPLE IX

*$16\alpha,17\alpha$-Oxido-21-Methylene-$\Delta^5$-Pregnene-$3\beta$-ol-20-One*

A solution containing 200 mgs. of $16\alpha,17\alpha$-oxido-21-methyl-ethylaminomethyl-$\Delta^5$-pregnene-$3\beta$-ol-20-one butyl bromide was dissolved in 15 ml. of water and clarified by filtration. The solution was adjusted to pH 12 by the cautious addition of 2% sodium hydroxide at 30° C. A white precipitate of the desired product separated and was recovered by filtration.

EXAMPLE X

*$16\alpha,17\alpha$-Oxido-21-Methylene-$\Delta^5$-Pregnene-$3\beta$-ol-20-One*

A solution containing 400 mgs. of $16\alpha,17\alpha$-oxido-21-diethylaminomethyl-$\Delta^5$-pregnene-$3\beta$-ol-20-one ethyl iodide was dissolved in 30 ml. of water and the solution clarified by filtration. A 2% aqueous solution of sodium citrate in 2 ml. of water was added. The resulting mixture was stirred for 4 hours during which time the desired product separated and was recovered by filtration.

EXAMPLE XI

*$16\alpha,17\alpha$-Oxido-21-Methylene-$\Delta^5$-Pregnene-$3\beta$-ol-20-One*

A total of 300 mgs. of $16\alpha,17\alpha$-oxido-21-dibutylaminomethyl-$\Delta^5$-pregnene-$3\beta$-ol-20-one ethyl bromide was dissolved in 20 ml. of water and adjusted to pH 12.0 with aqueous sodium hydroxide. The mixture was stirred at 30° C. for 6 hours. The desired product separated and was recovered by filtration.

EXAMPLE XII

*$16\alpha,17\alpha$-Oxido-21-Methylene-$\Delta^5$-Pregnene-$3\beta$-ol-20-One*

A total of 25 grams of $16\alpha,17\alpha$-oxido-$\Delta^5$-pregnene-$3\beta$-ol-20-one was taken up in 350 ml. of methanol containing 12 grams of paraldehyde and 40 grams of dimethylamine hydrochloride. The mixture was maintained at 90° C. under pressure for 24 hours. The hot mixture was filtered and the solution evaporated in vacuo. The residue was taken up in 400 ml. of ethanol containing a 50% molar excess of ethyl bromide and 2 grams of potassium acetate was added. The mixture was refluxed for 5 hours and evaporated to one-fifth volume. The desired product was precipitated by the addition of 4 volumes of water and collected by filtration.

EXAMPLE XIII

*$16\alpha,17\alpha$-Oxido-21-Methyl-$\Delta^5$-Pregnene-$3\beta$-ol-20-One*

A solution containing 1 gram of $16\alpha,17\alpha$-oxido-21-methylene-$\Delta^5$-pregnene-$3\beta$-ol-20-one was taken up in 200 ml. of 95% ethanol containing 250 ml. of palladium on carbon at 25 to 30° C. and hydrogen was bubbled in at atmospheric pressure. Reaction was stopped after 15 minutes and the catalyst removed by filtration. The catalyst was washed with an additional 50 ml. of 95% ethanol and the filtrates combined. The solvent was removed in vacuo leaving the desired product as a residue.

EXAMPLE XIV

*$16\alpha,17\alpha$-Oxido-21-Methyl-$\Delta^5$-Pregnene-$3\beta$-ol-20-One*

A total of 1 gram of $16\alpha,17\alpha$-oxido-21-methylene-$\Delta^5$-pregnene-$3\beta$-ol-20-one was taken up in 300 ml. of methanol containing 1 gram of 5% palladium on calcium carbonate at 15° C. and agitated under hydrogen at 10 atmospheres pressure. Reaction was stopped after 1 molar equivalent of hydrogen had been adsorbed and the catalyst removed by filtration. The catalyst was washed with an additional 50 ml. of methanol and the filtrates combined. The solvent was removed in vacuo leaving the desired product as a residue.

EXAMPLE XV

*$16\alpha,17\alpha$-Oxido-21-Methyl-$\Delta^5$-Pregnene-$3\beta$-ol-20-One*

A total of 1 gram of $16\alpha,17\alpha$-oxido-21-methylene-$\Delta^5$-pregnene-$3\beta$-ol-20-one was taken up in 250 ml. of ethyl acetate containing 2½ grams of palladium catalyst at 35° C. Hydrogen was bubbled in at atmospheric pressure. Reaction was stopped after 1 mole equivalent of hydrogen was adsorbed and the catalyst removed by filtration. The catalyst was washed with an additional 50 ml. of ethyl acetate and the filtrates combined. The solvent was removed in vacuo leaving the desired product as a residue.

EXAMPLE XVI

*5α,6β-Dibromo-16α,17α-Oxido-21-Methyl-Pregnane-3β-ol-20-One*

A mixture containing 0.5 gram of 16α,17α-oxido-21-methyl-Δ⁵-pregnene-3β-ol-20-one in 500 ml. of chloroform was treated with an equimolar portion of bromine in 300 ml. of methylene chloride while maintaining the temperature at 0° C. The mixture was kept at this temperature for 4 hours and a slight vacuum was applied to remove substantially all of the hydrogen bromide formed during the course of the reaction. The solution was washed with 5% aqueous sodium carbonate until neutral and then with water. It was dried over anhydrous sodium sulfate, filtered and the solvent removed in vacuo to leave the desired product as a residue.

EXAMPLE XVII

*5α,6β-Dibromo-16α,17α-Oxido-21-Methyl-Pregnane-3β-ol-20-One*

A mixture containing 0.5 mole of 16α,17α-oxido-21-methyl-Δ⁵-pregnene-3β-ol-20-one in 500 ml. of methylene chloride was treated with 1.1 molar equivalents of bromine in 300 ml. of octane while maintaining the temperature at 40° C. The mixture was kept at this temperature for one-half hour and a slight vacuum was applied to remove substantially all of the hydrogen bromide formed during the course of the reaction. The solution was washed with 5% aqueous potassium carbonate until neutral and then with water. It was dried over anhydrous sodium sulfate, filtered and the solvent removed in vacuo to leave the desired product as a residue.

EXAMPLE XVIII

*5α,6β,16β-Tribromo-21-Methyl-Pregnane-3β,17α-Diol-20-One*

To a suspension containing 3.05 grams of 5α,6β-dibromo-16α,17α-oxido-21-methyl-pregnane-3β-ol-20-one in 23 ml. of glacial acetic acid there was added 7.6 ml. of 30% hydrogen bromide solution in glacial acetic acid. The solution was allowed to stand at 25° C. for 1 hour. To this solution at 0° C., there was added 300 ml. of water. The desired product precipitated and was recovered by filtration.

EXAMPLE XIX

*5α,6β,16β-Tribromo-21-Methyl-Pregnane-3β,17α-Diol-20-One*

A solution containing 20 grams of 5α,6β-dibromo-16α,17α-oxido-21-methyl-pregnane-3β-ol-20-one in 200 ml. of propionic acid was prepared and a molar equivalent of hydrogen bromide in 30% propionic acid solution was added. The solution was maintained at 10° C. for 4 hours and then stirred into 1 liter of water at 5° C. The product precipitated and was recovered by filtration.

EXAMPLE XX

*5α,6β,16β-Tribromo-21-Methyl-Pregnane-3β,17α-Diol-20-One*

A solution containing 20 grams of 5α,6β-dibromo-16α,17α-oxido-21-methyl-pregnane-3β-ol-20-one in 200 ml. of glacial acetic acid was prepared. To this solution there was added a 100% molar excess of hydrogen bromide in 20% glacial acetic acid solution. The mixture was maintained at 30° C. for one-half hour and the solvent removed in vacuo. The residue was washed with ether and filtered to yield the desired product as a crystalline residue.

EXAMPLE XXI

*5α,6β,16β-Tribromo-21-Methyl-Pregnane-17α-ol-3,20-Dione*

A total of 20 grams of 5α,6β,16β-tribromo-21-methyl-pregnane-3β,17α-diol-20-one in 1500 ml. of acetone at 10° C. was treated with 30 ml. of 8 N chromic acid reagent in one portion with vigorous shaking. After 5 minutes, the reaction temperature rose to 22° C. and the entire reaction mixture was poured into 10 liters of water which caused precipitation of the ketone. The ketone was collected by filtration, washed with water and air-dried. An additional portion of the desired product was isolated by extracting the aqueous filtrate with chloroform, drying the organic layer over anhydrous sodium sulfate, filtering and evaporating the solvent in vacuo.

EXAMPLE XXII

*5α,6β,16β-Tribromo-21-Methyl-Pregnane-17α,-ol-3,20-Dione*

To a solution of 5 grams of 5α,6β,16β-tribromo-21-methyl-pregnane-3β,17α-diol-20-one in 25 ml. of glacial acetic acid there was added 15 ml. of a solution of chromium trioxide in 9:1 acetic acid-water solution containing 76 mgs. of chromium trioxide per ml. of solution. The mixture was kept at room temperature during the addition and for an additional 4 hours. The desired product was precipitated by the addition of water and collected by filtration.

EXAMPLE XXIII

*5α,6β,16β-Tribromo-21-Methyl-Pregnane-17α-ol-3,20-dione*

Chromic anhydride (0.125 gram) was added to 15 ml. of pyridine at approximately 5° C. and the mixture allowed to warm spontaneously to room temperature. To this solution there was added 2.5 grams of 5α,6β,16β-tribromo-21-methyl-pregnane-3β,17α-diol-20-one in 20 ml. of pyridine and the mixture was allowed to stand at room temperature for 24 hours. The solution was extracted with ether and the ether solution washed twice with 5% aqueous hydrochloric acid and then with water. The ether layer was dried over anhydrous sodium sulfate, filtered and the desired product obtained by removing the ether in vacuo.

EXAMPLE XXIV

*5α,6β,16β-Tribromo-21-Methyl-Pregnane-17α-ol-3,20-dione*

A solution of 0.5 gram of sodium dichromate dihydrate in 10 ml. of glacial acetic acid was added over a 30 minute period of 0.25 gram of 5α,6β,16β-tribromo-21-methyl-pregnane-3β,17α-diol-20-one in 50 ml. of 1:1 glacial acetic acid-benzene at 10° C. After 1 hour, an additional 0.3 gram of oxidizing agent in 7 ml. of solvent was added and the mixture left standing for 24 hours, at 10° C. It was poured into aqueous sodium bisulfite solution and the solution extracted with ether. The organic layer was washed with water until the washings were neutral, dried over anhydrous sodium sulfate, filtered and the ether removed in vacuo to isolate the desired product.

EXAMPLE XXV

*16β-Bromo-21-Methyl-Δ⁵-Pregnene-17α-ol-3,20-dione*

A mixture containing 5 grams of 5α,6β,16β-tribromo-21-methyl-pregnane-17α-ol-3,20-dione together with a 100% excess of zinc dust in 100 ml. of 1:1 methylene chloride and methanol was refluxed for 1 hour. At the end of this period, 5 ml. of acetic acid was added and the mixture refluxed for an additional 45 minutes.

EXAMPLE XXVI

*16β-Bromo-21-Methyl-Δ⁵-Pregnene-17α-ol-3,20-dione*

A mixture containing 5 grams of 16β-bromo-21-methyl-Δ⁵-pregnene-17α-ol-3,20-dione together with a 100% excess of zinc dust in 100 ml. of 1:1 methylene chloride-methanol was refluxed for 1 hour. At the end of this period, 5 ml. of acetic acid was added and the mixture refluxed for an additional 45 minutes. The mixture was filtered and the filtrate evaporated in vacuo to one-third volume. The desired product was precipitated by the addition of water, collected by filtration and air-dried.

EXAMPLE XXVII

*16β-Bromo-21-Methyl-Δ⁵-Pregnene-17α-ol-3,20-dione*

A total of 5 grams of 16β-bromo-21-methyl-Δ⁵-pregnene-17α-ol-3,20-dione was taken up in ethanol and a 200% excess of zinc dust was added portion-wise over a period of one hour while maintaining the temperature below 35° C. The temperature was increased to 35° C. and the mixture maintained at this temperature for an additional hour. It was then filtered and the desired product obtained by removing the solvent in vacuo. It was purified by trituration with water.

EXAMPLE XXVIII

*16β-Bromo-21-Methyl-Δ⁵-Pregnene-17α-ol-3,20-dione*

A mixture containing 5 grams of 16β-bromo-21-methyl-Δ⁵-pregnene-17α-ol-3,20-dione together with a 100% excess of zinc dust in 200 ml. of propanol was maintained at 80° C. for 1 hour. The mixture was filtered and the desired product recovered as described in the previous example.

EXAMPLE XXIX

*16β-Bromo-21-Methyl-Δ⁴-Pregnene-17α-ol-3,20-dione*

A total of 5 grams of 16β-bromo-21-methyl-Δ⁵-pregnene-17α-ol-3,20-dione was taken up in 150 ml. of methanol containing 3 ml. of concentrated ammonium hydroxide. The mixture was stirred at 20° C. for 1 hour. The ammonium hydroxide was neutralized by the addition of acetic acid and the solution concentrated to one-fifth volume. The desired product was precipitated by the addition of water. It was isolated by filtration, washed with water and air-dried.

EXAMPLE XXX

*16β-Bromo-21-Methyl-Δ⁴-Pregnene-17α-ol-3,20-dione*

A total of 5 grams of 16β-bromo-21-methyl-Δ⁵-pregnene-17α-ol-3,20-dione was taken up in 150 ml. of n-amyl alcohol containing 12 ml. of sulfuric acid. The mixture was maintained at 40° C. for 10 minutes. Sulfuric acid was neutralized by the addition of ammonium hydroxide and the solvent removed in vacuo. The residue was triturated with water and filtered to obtain the desired product.

EXAMPLE XXXI

*16β-Bromo-21-Methyl-Δ⁴-Pregnene-17α-ol-3,20-dione*

A total of 5 grams of 16β-bromo-21-methyl-Δ⁵-pregnene-17α-ol-3,20-dione was taken up in 150 ml. of ethanol containing 12 ml. of ammonium hydroxide. The mixture was maintained at 40° C. for 10 minutes and the product isolated as in Example XXIX.

EXAMPLE XXXII

*16β-Bromo-21-Methyl-Δ⁴-Pregnene-17α-ol-3,20-dione*

A total of 5 grams of 16β-bromo-21-methyl-Δ⁵-pregnene-17α-ol-3,20-dione was taken up in 150 ml. of isopropanol containing 3 ml. of sulfuric acid. The mixture was maintained at 20° C. for 60 minutes and the product isolated as in Example XXX.

EXAMPLE XXXIII

*21-Methyl-Δ⁴-Pregnene-17α-ol-3,20-dione*

A mixture containing 1 gram of 16β-bromo-21-methyl-Δ⁴-pregnene-17α-ol-3,20-dione and 10 grams of Raney nickel in 140 ml. of methanol was stirred in a nitrogen atmosphere at 25° C. for 4 hours. The mixture was filtered and concentrated to dryness. The residue was taken up in 50 ml. of chloroform and the chloroform solution washed twice with 30 ml. portions of water. The organic layer was separated, dried over anhydrous sodium sulfate, filtered and concentrated to dryness. The residue was triturated with a mixture of ethyl acetate and ether, filtered and dried.

EXAMPLE XXXIV

*21-Methyl-Δ⁴-Pregnene-17α-ol-3,20-Dione*

A mixture containing 4 grams of 16β-bromo-21-methyl-Δ⁴-pregnene-17α-ol-3,20-dione and 60 grams of Raney nickel in 300 ml. of propanol was stirred at 0° C. for 6 hours. The mixture was filtered and concentrated to dryness. The desired compound was isolated and purified in accordance with the procedure of the previous example.

EXAMPLE XXXV

*21-Methyl-Δ⁴-Pregnene-17α-ol-3,20-Dione*

A mixture containing 4 grams of 16β-bromo-21-methyl, Δ⁴-pregnene-17α-ol-3,20-dione and 40 grams of Raney nickel in 300 ml. of ethanol was stirred at 30° C. for one-half hour. The mixture was filtered and concentrated to dryness. The desired product was isolated and purified as described in Example XXXIII.

Compounds II and III whose formulas are shown above are representative of a class of new compounds within the scope of this invention having the formulas:

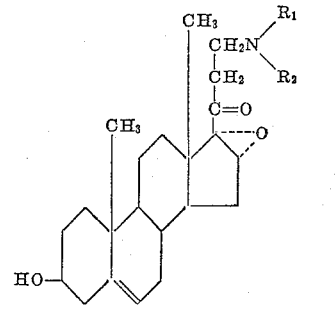

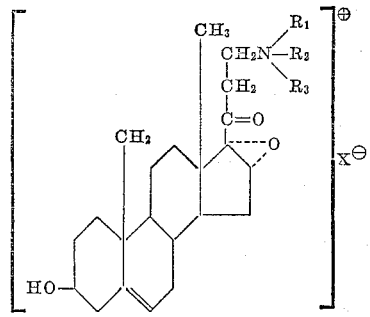

wherein $R_1$, $R_2$ and $R_3$ are each alkyl containing up to four carbon atoms and X is selected from the group consisting of chlorine, bromine and iodine.

What is claimed is:

1. A process which comprises reacting a compound having the formula:

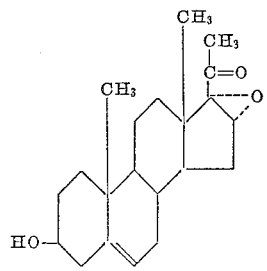

with a molar excess of formaldehyde and a lower alkyl amine salt containing up to four carbon atoms at a pH of from about 2.5 to about 5.0 at a temperature of from about 90° C. to about 140° C. in an alkanol solvent containing up to five carbon atoms for a period of from about 2 to about 24 hours to produce a compound having the formula:

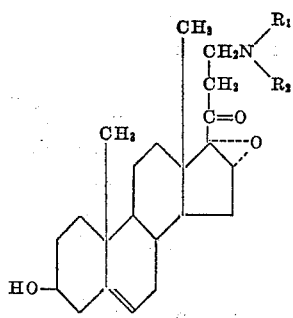

wherein $R_1$ and $R_2$ are each alkyl containing up to four carbon atoms; reacting said compound with an alkyl halide in a lower alkanol solvent containing up to two carbon atoms at a temperature of from about 20° C. to about 30° C. for a period of from 6 to about 16 hours to produce a compound having the formula:

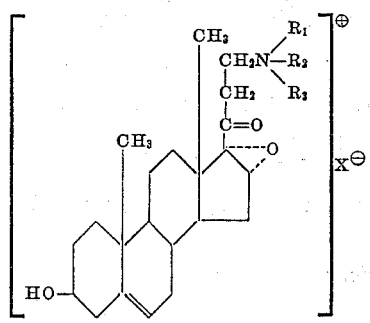

wherein $R_1$, $R_2$ and $R_3$ are each alkyl containing up to four carbon atoms and X is selected from the group consisting of chlorine, bromine and iodine; maintaining said compound in an aqueous solution at a pH of from about 7 to about 12 at a temperature of from about 20° C. to about 30° C. for a period of from about 1 to about 6 hours to produce a compound having the formula:

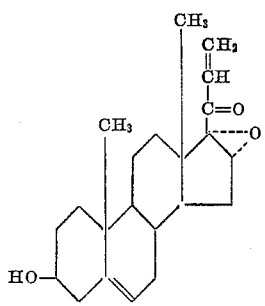

reacting said compound with hydrogen in the presence of palladium in a liquid medium at from about 15° C. to about 35° C. at a pressure of from about 1 to about 10 atmospheres to produce a compound having the formula:

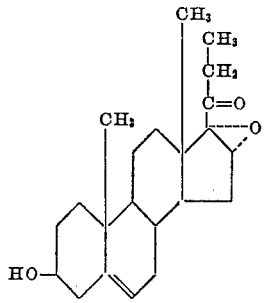

reacting said compound with from at least one molar equivalent to about 1.1 molar equivalents of bromine at a temperature of from about 0° C. to about 40° C. for a period of from about one-half to about four hours in a solvent selected from the group consisting of acetic acid and hydrocarbon and halogenated hydrocarbon solvents containing up to seven carbon atoms to produce a compound having the formula:

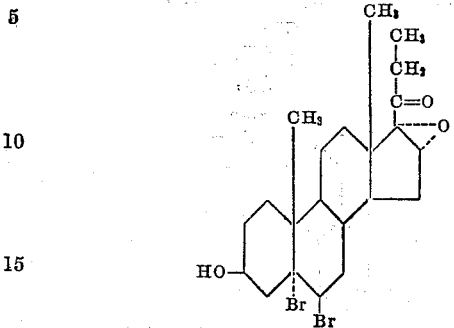

reacting said compound with from a molar equivalent to about a 100% molar excess of hydrogen bromide in a lower aliphatic organic acid solvent containing up to four carbon atoms at a temperature of from about 10° C. to about 30° C. for a period of from about one-half to about four hours to produce a compound having the formula:

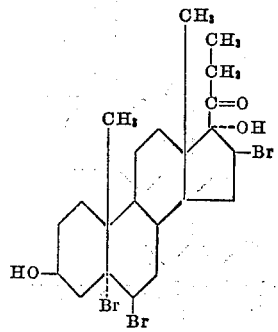

oxidizing said compound to produce a compound having the formula:

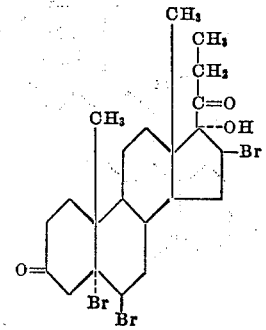

reacting said compound with from about a 100% excess to about a 200% excess of zinc dust in an alkanol solvent containing up to two carbon atoms at a temperature of from about 35° C. to about 80° C. for from about one to about two hours to produce a compound having the formula:

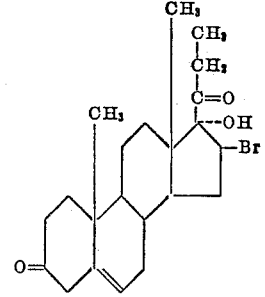

isomerizing said compound by reaction with from about 2% to about 8% by volume of a reagent selected from the group consisting of ammonium hydroxide and sulfuric acid in an alkanol solvent containing up to five carbon atoms for a period of from about 10 to about 60 minutes at a temperature of from about 20° C. to about 40° C. to produce a compound having the formula:

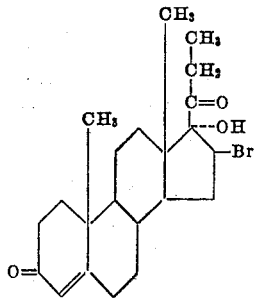

reacting said compound in a solvent selected from the group consisting of ethers, alcohols, acids and ketones containing up to five carbon atoms with from about four to about twenty grams of Raney nickel per gram of steroid at a temperature from about 0° C. to 30° C. to produce a compound having the formula:

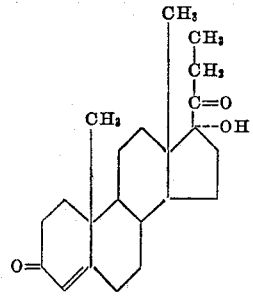

2. A compound selected from the group consisting of those having the formula:

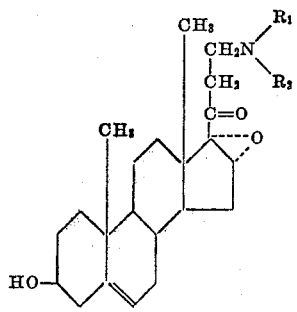

wherein $R_1$ and $R_2$ are each alkyl containing up to four carbon atoms.

3. A compound selected from the group consisting of those having the formula:

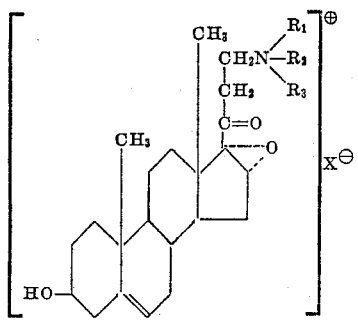

wherein $R_1$, $R_2$ and $R_3$ are each alkyl containing up to four carbon atoms and X is selected from the group consisting of chlorine, bromine and iodine.

4. 16α,17α - oxido-21-methylene-Δ⁵-pregnene-3β-ol-20-one.

5. 5α,6β - dibromo - 16α,17α - oxido-21-methyl-pregnane-3β-ol-20-one.

6. 5α,6β,16β - tribromo-21-methyl-pregnane-17α-ol-3,20-dione.

7. 16β - bromo-21-methyl-Δ⁵-pregnene-17α - ol - 3,20-dione.

References Cited in the file of this patent
UNITED STATES PATENTS

| | | |
|---|---|---|
| 2,789,989 | Julian et al. | Apr. 23, 1957 |
| 2,811,522 | Cutler | Oct. 29, 1957 |
| 2,912,444 | Ehrhart et al. | Nov. 10, 1959 |

OTHER REFERENCES

Romo et al.: J. Org. Chem. 21, 902–9 (1956).